US008101675B2

(12) United States Patent
Harris

(10) Patent No.: US 8,101,675 B2
(45) Date of Patent: Jan. 24, 2012

(54) COMMINUTABLE POLYESTERS

(75) Inventor: Ralph Edmund Harris, Surrey (GB)

(73) Assignee: Cleansors Limited, Guildford (GB)

( * ) Notice: Subject to any disclaimer, the term of this patent is extended or adjusted under 35 U.S.C. 154(b) by 104 days.

(21) Appl. No.: 12/095,201

(22) PCT Filed: Nov. 28, 2006

(86) PCT No.: PCT/GB2006/004432
§ 371 (c)(1),
(2), (4) Date: Jun. 10, 2008

(87) PCT Pub. No.: WO2007/060470
PCT Pub. Date: May 31, 2007

(65) Prior Publication Data
US 2008/0293843 A1    Nov. 27, 2008

(30) Foreign Application Priority Data

Nov. 28, 2005    (GB) .................................. 0524196.3

(51) Int. Cl.
*C08F 2/46*      (2006.01)
*B29B 9/00*      (2006.01)
*B29C 59/00*     (2006.01)
*B27L 11/00*     (2006.01)

(52) U.S. Cl. ............ 522/165; 522/182; 264/5; 264/118; 241/14

(58) Field of Classification Search .................. 522/165, 522/176, 182; 241/1, 14; 264/118, 5–14
See application file for complete search history.

(56) References Cited

U.S. PATENT DOCUMENTS

| 2,362,511 | A | * | 11/1944 | Teeters .......................... 528/361 |
| 3,766,031 | A |   | 10/1973 | Dillon |
| 4,029,870 | A | * | 6/1977  | Brown et al. .................. 526/255 |
| 4,220,511 | A |   | 9/1980  | Derbyshire |
| 4,986,355 | A |   | 1/1991  | Casad et al. |
| 5,049,465 | A | * | 9/1991  | Sakaguchi et al. ......... 430/58.45 |
| 5,916,929 | A |   | 6/1999  | Knobel et al. |
| 6,060,557 | A |   | 5/2000  | Dahmen et al. |
| 6,096,810 | A | * | 8/2000  | Asrar et al. ...................... 524/80 |
| 6,136,873 | A | * | 10/2000 | Hahnle et al. .................... 521/62 |
| 6,319,521 | B1 |  | 11/2001 | Randolph et al. |
| 6,565,768 | B1 |  | 5/2003  | Dentler et al. |
| 6,585,176 | B2 | * | 7/2003  | Mientkewitz et al. ............ 241/1 |
| 7,267,170 | B2 |  | 9/2007  | Mang et al. |
| 2001/0022327 | A1 |  | 9/2001  | Mientkewitz et al. |
| 2003/0220424 | A1 | * | 11/2003 | Schofalvi et al. .............. 524/195 |
| 2004/0152601 | A1 | * | 8/2004  | Still et al. ...................... 507/100 |
| 2006/0169449 | A1 |  | 8/2006  | Mang et al. |
| 2006/0169450 | A1 |  | 8/2006  | Mang et al. |
| 2006/0172894 | A1 |  | 8/2006  | Mang et al. |
| 2006/0172895 | A1 |  | 8/2006  | Mang et al. |
| 2007/0298977 | A1 |  | 12/2007 | Mang et al. |
| 2008/0009423 | A1 |  | 1/2008  | Mang et al. |
| 2008/0070810 | A1 |  | 3/2008  | Mang |

FOREIGN PATENT DOCUMENTS

| EP | 0 311 564 | 4/1989 |
| EP | 0 984 039 | 3/2000 |
| GB | 1 273 367 | 5/1972 |
| WO | WO 2004/037946 | 5/2004 |
| WO | WO 2005/095755 A1 * | 10/2005 |
| WO | WO 2006/067161 A1 | 6/2006 |

OTHER PUBLICATIONS

Stevens, Malcolm P.; Polymer Chemisry: An Introduction; 1999; Oxford Press; 3$^{rd}$ ed. (p. 169-171).*
International Search Report for PCT/GB2006/004432 dated Apr. 5, 2007.
Written Opinion of the International Searching Authority dated Apr. 5, 2007.
Nasr-El-Din et al, "Acid Fracturing of Gas Wells Using an Acid Precursor in the Form of Solids Beads: . . . ", SPE 110895, prepared for presentation at the 2007 SPE Annual Technical Conference and Exhibition held in Anaheim, California, Nov. 11-14, 2007.
Nature Works® PLA Engineering Properties; http://www.natureworksllc.com/product-and-applications/ingeo-biopolymer/technical-resource/~/media/product%20and%20applications/ingeo%20biopolymer/technical%20resource/processing%20guides/processingguides_engineeringproperties_pdf.ashx.
PLGA from Wikipedia; http://en.wikipedia.org/wiki/Plga.
GB Search Report in GB0811857.2 dated Mar. 12, 2010.
GB Search Report in GB0811857.2 dated Dec. 21, 2009.
GB Search Report in GB0811857.2 dated May 22, 2009.

* cited by examiner

Primary Examiner — Mark Eashoo
Assistant Examiner — Jessica Paul
(74) Attorney, Agent, or Firm — Nixon & Vanderhye, P.C.

(57) ABSTRACT

A process is disclosed for producing a polyester in powder form, which process comprises: (a) rendering a polyester comminutable by (i) chemical pre-treatment of the polyester, or (ii) irradiating the polyester; and (b) comminuting the polyester produced in step (a) to form a powder.

18 Claims, No Drawings

COMMINUTABLE POLYESTERS

This application is the U.S. national phase of International Application No. PCT/GB2006/004432 filed 28 Nov. 2006 which designated the U.S. and claims priority to Great Britain Application No. 0524196.3 filed 28 Nov. 2005, the entire contents of each of which are hereby incorporated by reference.

There are numerous existing and potential applications for powders of polyesters. For example, oil industry applications include acidizing, acid fracturing of oil and gas wells, use as components of drilling muds or drill-in fluids, diverting or fluid loss agents, as breakers for cross-linked stiff or rigid gels for temporary blocking, as breakers for fracturing gels, or agents for the carriage and controlled release or delivery of a range of well or formation treatment chemicals.

Pharmaceutical and biomedical applications include the use of polyester powders as components of drug or pharmaceutical delivery agents or preparations, as components of biocompatible or biodegradable scaffolds including porous or sintered scaffolds suitable for use in tissue growth or repair processes e.g. bone or skin growth or repair.

Polyester powders may also be useful as carriers or agents for the controlled rate delivery of many types of chemicals in numerous other industrial applications. The chemicals may include veterinary pharmaceuticals; agrochemicals including plant growth regulators; nutrients such as fertilizers, micronutrients or minerals; biocides such as bactericides, viricides, fungicides, insecticides, algaecides, molluscides or herbicides; pH adjusting agents; dyes, fragrances; pigments, including pigments used in toners or components of cleaning preparations in applications including, for example, agricultural, (e.g. silage, animal husbandry) effluent treatment, environmental, gardening, laundry, food or household applications.

Polyester powders may also be used directly in artificial latex, as coatings (for example paper) as binders, as mild abrasives, as paint additives, in adhesives or for powder coating applications. In addition polyester powders may be used in composite materials, packaging materials or energy absorbing materials.

There is particular interest in industrial applications of powders of water soluble polyesters, for example those produced from lactic acid, glycolic acid, lactide, glycolide, hydroxybutyric acid (such as polylactide, polyglycolide, polyhydroxybutyric acid) or water soluble copolymers. A number of these polyesters are particularly suited for use in oil industry applications and other industrial applications where their biocompatibility, high environmental acceptability, and predictable rate of dissolution and acid production give an advantage. In addition they may be produced from renewable resources.

A number of methods are available for producing powders of polyesters. These include conventional grinding, solvent based methods such as dissolving the polyester in a solvent followed by spray drying, emulsion polymerisation or dispersion of a polymer melt.

Where grinding may be used, it is often the preferred choice due to its relatively low cost and simplicity and ease of scale-up. Other routes to produce polyester powders are often expensive and can be problematic. For example, some polyesters are only soluble in a limited range of solvents which may not be particularly acceptable from an operational, environmental or health and safety point of view. For example, polylactide dissolves in a relatively small number of solvents, mostly chlorinated hydrocarbons. Traces of solvent up to a few percent w/w may remain in the powder, even after drying, and this is highly undesirable. Emulsion polymerisation or dispersion of a polymer melt require careful process control and may be energy intensive. Dispersion methods may leave high concentrations of surfactant in the product, which is again undesirable.

However, many commercially available polyesters, including those that would otherwise be suitable for oilfield applications, are not readily comminutable by conventional grinding or similar processes, even using cryogenic grinding, in part due to their low glass transition temperature (Tg). It is currently difficult or impossible to produce large amounts of powder from such polyesters at an acceptable cost via grinding type methods.

Although the use of polyester powders has been taught for a number of oilfield applications, details of how to produce polyester-only powders by grinding type methods have not been disclosed and such powders do not appear to be commercially available. PCT/EP2003/01156 (publication no. WO 2004/037946) discloses that powders may be produced from a polyester that is mixed and co-extruded with a suitable filler, such as calcium carbonate, which presumably alters the material's characteristics allowing grinding. Obviously, particles produced by such a method comprise a mixture of polyester and filler in the same particle. U.S. Pat. No. 4,986,355 teaches a process of preparing suitably sized polyester particles for use as a fluid loss additive or as a gel breaker in a subterranean formation by dispersion of a polymer melt.

There is a need for simple processes for preparing powders of those polyesters that typically cannot be prepared by conventional comminution processes. There is a further need for processes that produce a product that does not contain undesirable contaminants such as solvents and surfactants.

It is an object of the present invention to provide a process by which polyester powders, particularly powders of water soluble polyesters such as polylactides, polyglycolides, polyhydroxybutyric acid, copolymers and the like, which are suitable for use in oilfield and other applications, may be produced by standard comminution methods such as grinding and which can be readily scaled-up. A further object is to provide a process for producing polyester powders that are free of contaminants such as solvents and surfactants. An additional object is to provide a process for producing a polyester powder from commercially available polyester resins.

Accordingly, the present invention provides a process for producing a polyester in powder form, which process comprises:
 (a) rendering a polyester comminutable by (i) chemical pre-treatment of the polyester, or (ii) irradiating the polyester; and
 (b) comminuting the polyester produced in step (a) to form a powder.

The invention also provides a process for producing a polyester in powder form, which process comprises:
 (a) rendering a polyester comminutable by (i) chemically synthesising the polyester such that it includes covalent branch points in its structure, or (ii) irradiating the polyester; and
 (b) comminuting the polyester produced in step (a) to form a powder.

The process of the present invention may be applied to those families of polyesters that are not readily comminutable, such as polylactic acid, polyglycolic acid, polylactides, polyglycolides and their copolymers, including copolymers with caprolactone. The polyesters may be rendered comminutable by either pre-treatment of the polyester by irradiation or by a chemical pre-treatment. Generally it will be desirable to irradiate or chemically pre-treat a commercially available polyester resin.

When the polyester is chemically synthesised such that it includes covalent branch points in its structure, the introduction of such covalent branch points may be by the incorporation into the polymer of non-ester monomeric units, such as compounds of the type described herein, giving rise to a polyester copolymer product. In contrast, when all the constituent monomers of the product are ester units the product is a polyester homopolymer.

When using irradiation is used to render the polyester comminutable, commercially available irradiation services will normally be used, using a suitable radiation source and operated by those skilled in the art. The irradiation source is selected from the group consisting of a source of gamma radiation such as a cobalt source, X-rays, UV rays and high-energy electron beams. Preferably the irradiation source is a cobalt source or high-energy electron beam. Methods of operating the irradiation process, such as use of batch or continuous processing, use of totes or conveyor belts and process monitoring will be well known to those skilled in the art. Issues such as use of the correct packaging, heating of the material and generation and venting of gases produced during irradiation will be taken into account when operating the irradiation processes. The radiation dose used will be sufficient to render the polyester comminutable.

Without wishing to be bound by theory, it is believed that the effects of irradiation include chain scission and/or cross-linking of the polyester chains. Suitable and sufficient chain scission and/or cross-linking change the chemical structure of the polymer result in alteration of the macroscopic properties of the polymer, rendering it comminutable. Chain scission reduces the average length of polymer strands and increases the number of end groups. Cross-linking introduces branching into the polyester.

Irradiation is particularly useful for treating commercially available polyesters that are otherwise not readily comminutable by conventional methods.

The dose required to render the polyester comminutable may vary and will normally be determined experimentally for each polyester on a case-by-case basis. For commercially available polylactide resins the dose required is of the order of 300 kGy to 700 kGy.

An alternative to the use of irradiation as a pre-treatment to render a polyester comminutable, is to use a chemical pre-treatment.

Suitable chemical pre-treatments which can render the polyester comminutable include chemical treatments that can achieve suitable and sufficient chain scission and/or cross-linking such that the macroscopic properties of the polymer are altered sufficient to render it comminutable.

Pre-treatments that can produce chain scission include hydrolysis, alcoholysis, acidolysis or aminolysis. Methods of carrying out such treatments on polyesters and similar polymers are well known to those skilled in the art.

Pre-treatments that can produce cross-linking in a polyester will also be well known to those skilled in the art. Such methods include reactive blending in the presence of suitable cross-linking agents and initiators. Reactive blending is defined as a mixing process that is accompanied by chemical reaction(s) of the components of a polymer mixture. Examples of reactive blending include (a) blending accompanied by formation of polymer-polymer complex, (b) formation of block or graft copolymers by a combination of radicals formed by mechanochemical scission of respective polymers during blending. Reactive blending may also be carried out as a reactive extrusion or reaction injection molding (RIM).

Suitable initiators will be well known to those skilled in the art and include hydroperoxides, alkyl peresters, peroxides such as benzoyl peroxide, organic polyoxides, azo compounds such as azobisisobutyronitrile (AIBN), persulphates and percarbonates.

Suitable cross-linking agents include compounds that are capable of forming 3 or more covalent bonds between polyester chains.

Any compound capable of reacting with polyester chains to introduce a branch point may be used. Suitable compounds include polyols, such as diglycerol, triglyceryl and polyglycerols; polycarboxylic acids; polyhydroxycarboxylic acids; polyamines; and polyamino acids. One of more of such compounds may be used. Typically, ester and/or amide bonds will be formed. Preferred compounds for incorporation include glycerol, polyvinyl alcohol, sorbitol, pentaerythritol or citric acid. Other suitable compounds including suitable polyhydroxycarboxylic acids, polyamines or polyamino acids that may be used to introduce branching into polyesters during synthesis will be apparent to those skilled in the art of polyester synthesis, including the art of dendrimer synthesis.

For applications where biocompatibility, high environmental acceptability, and predictable rate of dissolution and acid production is required, including oilfield applications, suitable comminutable polyesters are those based on one or more of lactic acid, glycolic acid, lactide, glycolide, caprolactone and other suitable co-monomers such as those compounds useful for introducing branch points.

Varying the molecular weight or linearity of water soluble polyesters as a means of varying their hydrolysis rate is known. However, the pre-treatment of commercial polyester resins such as polylactide resin as a means of improving their comminutability has not previously been taught.

The copolymerisation of polyesters with molecules that have functionality as oilfield treatment chemicals may also be possible. For example, polycarboxylates have functionality as scale inhibitors.

Other oilfield treatment chemicals may also be incorporated into the polyester by dispersion, before comminution and normally during when the polymer is in a molten state, for example by mixing prior to extrusion of a polymer melt to produce prills.

Useful oilfield treatment chemicals include, but are not limited to, scale inhibitors, asphaltene inhibitors and corrosion inhibitors. Suitable oilfield chemicals that might be incorporated into the polyester by copolymerisation or dispersion during synthesis and extrusion processes and methods of incorporating such chemicals will be apparent to those skilled in the art of oilfield chemistry, polyester synthesis and handling of polymer melts.

Comminution processes that may be used to reduce the size of the polyester that has been render comminutable according to the processes of the present invention are any processes that will be known to those skilled in the art of comminution including but not being limited to, milling, grinding, crushing, attrition and cutting processes such as ball mills, jet mills, opposed jet mills or hammer mills provided that at least one such method is effective in comminuting the polyester that has been rendered comminutable.

The polyester will be comminuted to produce particles with a particle size distribution suitable for the intended application. For oilfield applications this will normally be particles in the size range 1 micron to 2 mm, most preferably 10 microns to 100 microns.

The method of rendering a polyester comminutable will be selected on a case by case basis depending on the characteristics required in the comminuted polyester in its specific application, the extent to which these characteristics are achieved by each method and by other considerations such as the cost.

One skilled in the art will understand that it may be desirable in some circumstances to use a combination of chemical pre-treatment and irradiation to render a polyester comminutable.

The process of the present invention is further illustrated by the following example.

Example 1

An extrusion grade of commercial polylactide resin was purchased from Cargill Dow. Conventional grinding processes were tried, including cryogenic grinding without success. The resin was irradiated at different radiation doses and at doses of 400 and 500 kGy the material became comminutable by a variety of grinding processes. Powders with mean diameters of 28 to 40 microns were obtained.

The process of the invention has the following advantages over the prior art. It provides processes for obtaining powders of polyesters via standard mechanical comminution methods, where the untreated polyester would not otherwise be comminutable. It provides processes that do not require solvents or surfactant so do not contain residues of solvent or surfactant in the polyester powders produced.

The invention claimed is:

1. A process for producing a polyester in powder form, the polyester being derived from one or more of lactic acid, glycolic acid, lactide, glycolide and caprolactone, which process comprises:
    (a) rendering a polyester comminutable by (i) chemically pre-treating the polyester by reactive blending in the presence of one or more suitable crosslinking agents and initiators, such that chain scission results, or (ii) irradiating the polyester using an irradiation source selected from a gamma radiation source and X-rays, such that chain scission results; and
    (b) comminuting the polyester produced in step (a) to form a powder.

2. A process according to claim 1 which comprises, in step (a), both (i) chemically pre-treating the polyester, and (ii) irradiating the polyester.

3. A process according to claim 1 which comprises chemically pre-treating the polyester such that chain scission results.

4. A process according to claim 3 wherein the chemical pre-treatment comprises reacting the polyester with one or more molecules which are each capable of forming 3 or more bonds selected from the group consisting of ester bonds and amide bonds.

5. A process according to claim 4 which comprises reacting the polyester with one or more selected from the group consisting of a polyol, polycarboxylic acid, polyhydroxycarboxylic acid, polyamine and polyamino acid.

6. A process according to claim 4 which comprises reacting the polyester with one or more selected from the group consisting of glycerol, sorbitol, polyvinyl alcohol, pentaerythritol and citric acid.

7. A process according to claim 1 wherein the initiator is selected from the group consisting of an hydroperoxide, alkyl perester, peroxide, organic polyoxide, azo compound, persulphate and percarbonate.

8. A process according to claim 1, wherein the gamma radiation source is a cobalt source.

9. A process according to claim 1, which comprises, in step (a) (ii), irradiating the polyester with a radiation dose which is sufficient to render the polyester comminutable.

10. A process according to claim 1 wherein, in step (a) (ii), the radiation dose is within the range of from about 300 kGy to 700 kGy.

11. A process according to claim 1 wherein the polyester is a copolymer derived from one or more of lactic acid, glycolic acid, lactide, glycolide and caprolactone and a compound capable of forming 3 or more bonds selected from the group consisting of ester bonds and amide bonds.

12. A process according to claim 11 wherein the compound capable of forming 3 or more bonds selected from the group consisting of ester bonds and amide bonds is selected from the group consisting of a polyol, polycarboxylic acid, polyhydroxycarboxylic acid, polyamine and polyamino acid.

13. A process according to claim 12 wherein the compound capable of forming 3 or more bonds selected from the group consisting of ester bonds and amide bonds is glycerol, sorbitol, polyvinyl alcohol, pentaerythritol and citric acid.

14. A process according to claim 1, which further comprises incorporating one or more other chemicals into the polyester by one of (i) dissolution, (ii) dispersion and (iii) dissolution and dispersion.

15. A process according to claim 1, which comprises comminuting the polyester by a process selected from the group consisting of milling, grinding, crushing, attrition, and a cutting process.

16. A polyester in powder form which is obtained by a process as defined in claim 1.

17. An oilfield treatment composition which comprises a polyester in powder form as defined in claim 16.

18. A process according to claim 1, which further comprises formulating the resulting polyester in powder form into an oilfield treatment composition.

* * * * *

UNITED STATES PATENT AND TRADEMARK OFFICE
CERTIFICATE OF CORRECTION

PATENT NO. : 8,101,675 B2
APPLICATION NO. : 12/095201
DATED : January 24, 2012
INVENTOR(S) : Harris It is certified that error appears in the above-identified patent and that said Letters Patent is hereby corrected as shown below:

Title Page, Item (73) Assignee should read: CLEANSORB LIMITED, Guildford (GB)

Signed and Sealed this
Fourteenth Day of August, 2012

David J. Kappos
*Director of the United States Patent and Trademark Office*